J. S. CHASE.
WATER CRAFT.
APPLICATION FILED OCT. 9, 1908.
919,694.
Patented Apr. 27, 1909.
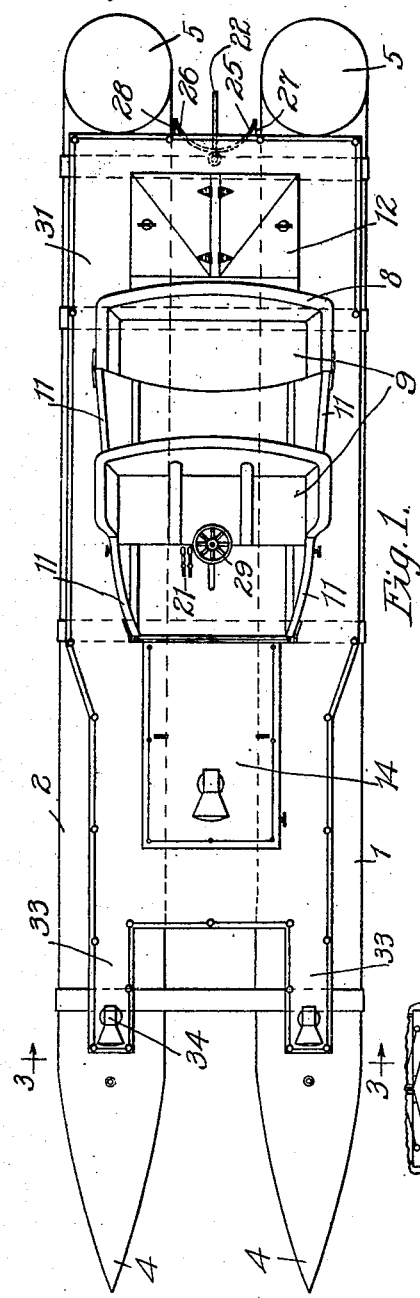
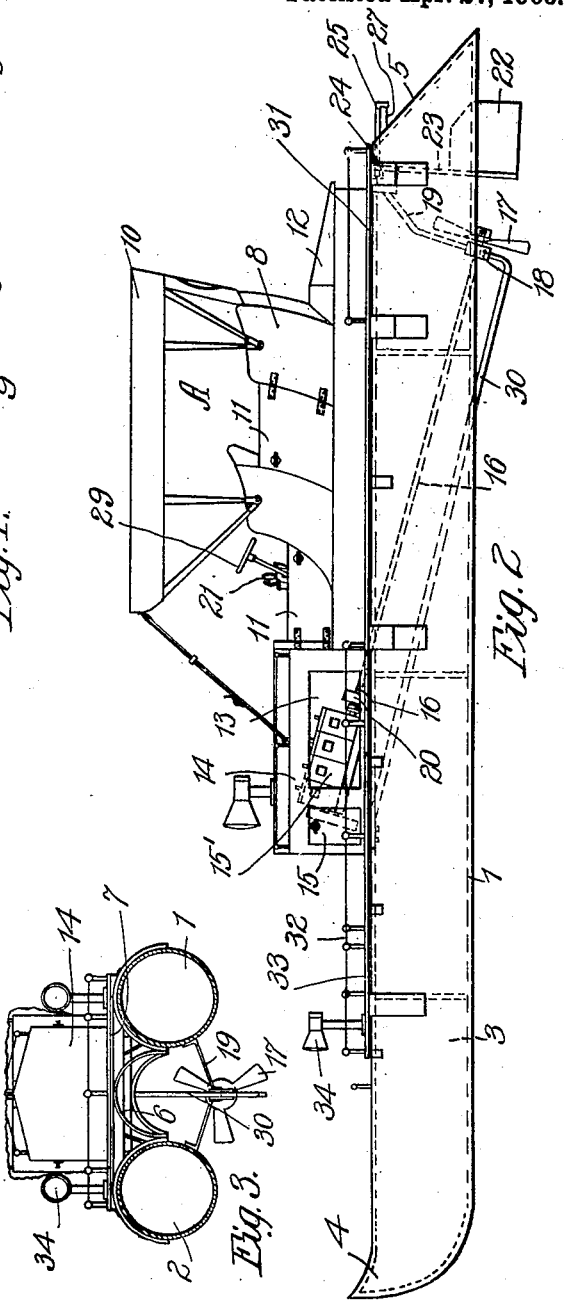
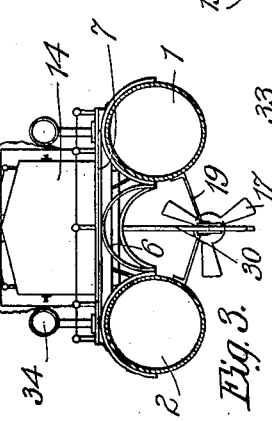
Witnesses
George C. Higham.
Leonard W. Novander.
Inventor
J. Serene Chase
By
Attorneys
THE NORRIS PETERS CO., WASHINGTON, D. C.

UNITED STATES PATENT OFFICE.

JAMES SERENE CHASE, OF FENNVILLE, MICHIGAN.

WATER-CRAFT.

No. 919,694.　　　　Specification of Letters Patent.　　Patented April 27, 1909.

Application filed October 9, 1908.　Serial No. 456,930.

*To all whom it may concern:*

Be it known that I, JAMES SERENE CHASE, a citizen of the United States, residing at Fennville, in the county of Allegan and State of Michigan, have invented a certain new and useful Improvement in Water-Craft, of which the following is a full, clear, concise, and exact description, reference being had to the accompanying drawings, forming a part of this specification.

My invention relates to water craft, particularly to auto-boats, its object being to obtain increased stability, comfort and general efficiency.

The craft of my invention involves a plurality of tubular floats which are long in comparison to their section dimensions, which section may be either elliptical or circular. Two such floats are preferably used, and on them I mount an automobile structure which is practically complete with the exception of the wheels and axles. The floats extend well to the sides of the automobile structure to give great stability and the floats are divided into water-tight compartments, thus reducing to a minimum the danger of overturning or sinking. The automobile engine, instead of connecting with driving axles and wheels, connects with a propeller mounted centrally between the floats, any suitable reversing and speed-changing mechanism intervening between the engine and propeller and controlled by any suitable lever mechanism operable by the occupants of the automobile. The automobile steering wheel, instead of connecting with wheels, is connected with a rudder. The doors and inclosures of the automobile body are all made water-tight and a substantial deck surrounds the automobile body and extends over the floats.

By reference to the accompanying drawings my invention will be more fully understood.

In these drawings Figure 1 is a plan view of my improved water craft; Fig. 2 is a side view, and Fig. 3 is a sectional view taken on plane 3—3, Fig. 1.

I have shown two float members 1 and 2 which are tubular and of circular cross-section and which are long in comparison with their diameter. Each float is divided into a plurality of compartments 3 sealed from each other, so that a puncture of any one compartment will not seriously affect the floating qualities of the craft. The front ends 4 of the floats are tapered and pointed, while the rear ends 5 are cut away on the slant as shown. The two floats are connected together by a number of brace frames 6 which, of course, may be built up in any suitable manner to give the necessary strength and rigidity. The top of these frames provide supporting cross bridges 7. Mounted on these cross bridges 7 is the automobile structure A, which structure may be practically a complete automobile outfit, with the exception of the wheels and axles. The body part 8 may have seats 9 arranged in any desired manner and may be covered by a top 10. The doors 11 of the body part and the various doors or covers 12 of the structure are adapted to be closed water-tight so that persons in the seats are protected against waves and spray.

The engine compartment 13 is inclosed by hood 14 whose doors or covers 15' also close water-tight. The engine 15 within the compartment 13 connects in any suitable manner with the propeller shaft 16 which terminates at the stern end of the floats and there carries the propeller 17. The rear end of this shaft journals in the bearing 18 which is rigidly held by framework 19 secured to the floats. Any suitable reversing mechanism 20 may be interposed between the engine and propeller shaft, which mechanism may be controlled by lever mechanism 21 in the automobile body. To the rear of the propeller is the rudder 22 extending from rudder post 23 which rotates in the bearing 24 suitably supported from the floats and connecting framework. Arms 25, 26 extend from the top of the rudder post and connect by cords or chains 27, 28 with the steering gear 29 operable in the automobile body. The propeller shaft, as shown, extends rearwardly and slantingly downward, the propeller bridging below the keels of the floats. To protect the propeller shaft I provide a guard 30 in the form of a rod secured at one end to the bearing 18 and at its other end to the framework of the floats, this guard rod running practically parallel with the propeller shaft and below and in front of said shaft. Any obstructions will, therefore, be encountered by the guard rod and bending of the propeller shaft will be prevented. The entire automobile frame is surrounded by a deck 31 supported on the cross bridges 7, guard rails 32 surrounding the deck. The deck may also have the extensions 33 over the front of the floats, as shown. Lamps 34 can be installed at suitable places for lighting or signaling purposes.

As shown in Fig. 3, the floats are well to the sides of the automobile structure to lend stability to the craft and to reduce to a minimum the danger of overturning. The tubular floats being long and of comparatively small diameter, will cut through the water with little resistance. The floats also are separated and not in direct contact, and the framework connecting them is clear of the water, and therefore will further reduce the friction and resistance. The spacious automobile body and the expansive deck surrounding the automobile structure afford comfort which is not obtained in water craft of this class of the prior art, which are all more or less cramped.

Changes may, of course, be made in the construction and arrangement. I do not limit myself to the exact construction and arrangement shown, and

I claim as new and desire to secure the following claims by Letters Patent—

1. In a water craft, the combination of two parallel float members of slender tubular construction, flat supporting bars 7 extending between the float members, brace members 6 connecting with the float members and the cross bars, an automobile body A permanently mounted on said cross bars, an engine frame 13 in front of the automobile body, a propeller 17 supported at the stern of said float members, a shaft 16 connecting said propeller with an engine within said engine compartment, controlling levers in the automobile body for controlling the operation of said engine, a rudder 22 supported at the stern of said float members, a steering wheel within the automobile body connected with said rudder, a main deck 31 surrounding the automobile body, and auxiliary decks 33 extending forwardly along the float members.

2. In a water craft of the class described, the combination of two slender tubular float members 4, frames 6 encircling and bridging between said float members, cross bars 7 engaging the frames and lying close to the float members, an automobile body A permanently secured to the cross members, a frame forming an engine compartment in front of the automobile body, an engine in said compartment, a propeller between the stern ends of the float members connected with said engine, and a rudder between the stern ends of the float members, said engine and rudder being controllable from the automobile body.

3. In a water craft of the class described, the combination of two parallel slender tubular float members, bridge members for securely holding said float members in parallel alinement, an automobile body mounted directly on top of the float members and secured to the bridge members, an engine in the front of the automobile body, a propeller between the stern ends of the float members, a shaft extending downwardly and rearwardly from the engine and connecting with the propeller, controlling means for said engine within the automobile body, and a guard rod extending below and parallel with the propeller shaft to protect said shaft.

In witness whereof, I hereunto subscribe my name this 6th day of October A. D. 1908.

J. SERENE CHASE.

Witnesses:
 MILDRED WALZ,
 LOUIS WALZ.